US008060781B2

(12) United States Patent
Ishikawa et al.

(10) Patent No.: US 8,060,781 B2
(45) Date of Patent: Nov. 15, 2011

(54) DATA PROCESSING APPARATUS AND PROGRAM

(75) Inventors: Tetsuya Ishikawa, Hachioji (JP); Tomohiro Suzuki, Nishitokyo (JP); Yuji Tamura, Hachioji (JP); Hiroyasu Nishimura, Hachioji (JP); Tomoya Ogawa, Hachioji (JP); Fumikage Uchida, Asaka (JP); Nao Moromizato, Hino (JP); Munetoshi Eguchi, Hachioji (JP); Kenji Okuyama, Yokohama (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 394 days.

(21) Appl. No.: 11/866,718

(22) Filed: Oct. 3, 2007

(65) Prior Publication Data
US 2008/0086659 A1    Apr. 10, 2008

(30) Foreign Application Priority Data
Oct. 6, 2006    (JP) ................................ 2006-274630

(51) Int. Cl.
*G06F 11/00* (2006.01)
(52) U.S. Cl. ............................. 714/22; 714/24; 714/6.1
(58) Field of Classification Search .................... 714/22, 714/6.1, 14, 24
See application file for complete search history.

(56) References Cited

U.S. PATENT DOCUMENTS

| 6,944,286 B1* | 9/2005 | Nossing ................... 379/387.01 |
| 2002/0156983 A1* | 10/2002 | Jones et al. .................... 711/143 |
| 2004/0078663 A1* | 4/2004 | Inaba .............................. 714/22 |
| 2004/0193955 A1* | 9/2004 | Leete et al. ..................... 714/22 |
| 2007/0174698 A1* | 7/2007 | Bailey et al. ..................... 714/22 |
| 2008/0229161 A1* | 9/2008 | Lee et al. ....................... 714/710 |

* cited by examiner

*Primary Examiner* — Scott Baderman
*Assistant Examiner* — Sarai Butler
(74) *Attorney, Agent, or Firm* — Finnegan, Henderson, Farabow, Garrett & Dunner, L.L.P.

(57) ABSTRACT

A data processing apparatus which saves data in a volatile memory into a nonvolatile memory when power is off, the data processing apparatus including:
  a detecting circuit for outputting a momentary interruption detecting signal when a power source voltage is below a first threshold voltage, and a power failure detecting signal when the power source voltage is below a second threshold voltage that is lower than the first threshold voltage; and
  a control section adapted to start saving of the data in the volatile memory into the nonvolatile memory when the detecting circuit has output the momentary interruption detecting signal, continue save of the data, and carry out a predetermined shutdown processing when the detecting circuit has output the power failure detecting signal after the detecting circuit has output the momentary interruption detecting signal.

12 Claims, 15 Drawing Sheets

DATA PROCESSING APPARATUS AND PROGRAM

RELATED APPLICATION

This application is based on Japanese Patent Application No. 2006-274630 filed on Oct. 6, 2006 in Japanese Patent Office, the entire content of which is hereby incorporated by reference.

TECHNICAL FIELD

The present invention relates to a data processing apparatus and program wherein data is saved into a nonvolatile memory from a volatile memory when power is off.

In a data processing apparatus wherein predetermined data is saved into an nonvolatile memory from the volatile memory such as a system memory when poser is off, data is normally saved into the nonvolatile memory from the volatile memory between the time when power failure is detected by a power failure detecting circuit, and the time when a reset signal is outputted to a circuit component such as a CPU (Central Processing Unit) from the resetting circuit.

FIG. 15 is a timing chart representing an example of the relationship between the waveform of each section, and the data save time period when the AC input has been turned off. Immediately when the AC input has been interrupted at time T1, the output voltage of the smoothing circuit exhibits a gradual decrease. When this voltage has decreased to a predetermined power failure identification threshold value, a power failure detecting signal is outputted from the power failure detecting circuit (time T2), and data saving is initiated based on the output of this power failure detecting signal. The DC power source for supplying a DC voltage to the circuit component such as a CPU maintains the normal output voltage for some time after suspension of the AC input, using the electric charge stored in the capacitor. When the output voltage of the DC power source has been reduced below the predetermined reset threshold voltage, a reset signal is outputted from the resetting circuit (time T3). The data is saved, in a limited time period ranging from detection of power failure to the output of the reset signal.

Incidentally, in addition to the normal power failure, there is momentary power interruption wherein the AC input is interrupted momentarily. In some apparatus, detection is made by distinguishing between the normal power failure and momentary interruption, whereby appropriate measures are taken to each phenomenon. For example, Unexamined Japanese Patent Application Publication No. 11-51985 discloses a computation processing apparatus, wherein the system thereof monitors the time passed from the AC input is interrupted, and it suspends the main job if the time has exceeded a first time limit, based on the judgment that momentary interruption has occurred; whereas the system takes a predetermined action against power failure after the expiration of a second time limit which is longer than the first time limit, based on the judgment that power failure has occurred.

Access to the nonvolatile memory takes more time than access to the volatile memory. In the conventional art, a long time has been required to save data into the nonvolatile memory when power is off, and there has been no sufficient time, on the one hand. On the other hand, there is an increase in the amount of data to bed saved into the nonvolatile memory due to growing sophistication of the system in recent years. There is an active demand to save more data within the time wherein the power is an (prior to outputting of the reset signal).

To meet this demand, for example, an attempt is made to implement a series of procedures against power failure in response to the detection of the momentary interruption that occurs earlier than the power failure. If the power source conditions are not satisfactory, momentary power failure frequently occurs and this is accompanied by frequent action to be taken against power failure, with the result that the apparatus is stopped. Such a trouble occurs in this attempt.

In an apparatus carrying an optional apparatus as in the case of a digital photocopier, there is an increase in the current consumption in the overall apparatus when an option is mounted, as compared to the case wherein the option is not mounted. This results in a shorter time from the suspension of the AC input to the output of the reset signal. This will further reduce the time allowance for data saving.

The aforementioned problem with data saving at the time of power suspension can be solved by installing an uninterruptible power supply system. However, in a data processing apparatus of great power consumption as in the case of a digital photocopier provided with a fixing heater, an uninterruptible power supply system to be used will be large in size and high in costs.

In the meantime, in the technique disclosed in said prior art, the power failure is distinguished from the momentary power failure according to the length of time when the AC input is interrupted, whereby the power failure and power recovery is detected without oscillation. This technique fails to meet the requirement of increasing the amount of data to be saved into the nonvolatile memory when power is off.

Further, in the above-mentioned technique, when the time of the AC input being interrupted has exceeded the second time limit, this trouble is determined as a power failure. The current consumption of the entire apparatus varies according to the status of the optional apparatus being mounted, or the mode of the apparatus operation (the working mode or standby mode) when the AC input has interrupted. If there is a great current consumption, the operation will fail before power failure is detected, and data saving operation may not be completed.

SUMMARY

The object of the present invention is to solve the aforementioned problem and to provide a data processing apparatus and the program thereof wherein, when power is off, more data can foe saved into the nonvolatile memory from the volatile memory.

To achieve the aforementioned object, the present invention provides a data processing apparatus which saves data in a volatile memory into a nonvolatile memory when power is off, the data processing apparatus including: a detecting circuit for outputting a momentary interruption detecting signal when a power source voltage is below a first threshold voltage, and a power failure detecting signal when the power source voltage is below a second threshold voltage that is lower than the first threshold voltage; and a control section adapted to start saving of the data in the volatile memory into the nonvolatile memory when the detecting circuit has output the momentary interruption detecting signal, continue save of the data, and carry out a predetermined shutdown processing when the detecting circuit has output the power failure detecting signal after the detecting circuit has output the momentary interruption detecting signal, a data processing apparatus for saving data in a volatile memory into a nonvolatile memory when a power is off, the data processing apparatus including: a detecting circuit for outputting a momentary interruption detecting signal when a power source voltage is below a predetermined threshold voltage; and a control section adapted to start a saving of the data in the volatile memory into the nonvolatile memory when the detecting circuit outputs the momentary interruption defecting signal, continue the saving of the data and carry out a predetermined shutdown processing in the case where the detecting circuit outputs the momentary interruption detecting signal even after a predetermined time period has elapsed since the detecting circuit started outputting the momentary interruption detecting signal, a computer readable memory medium storing a program to be executed by a computer having a volatile memory and a none volatile memory, wherein by execution of the program, a saving of data in the volatile memory into the nonvolatile memory starts when a momentary interruption detecting signal is detected that denote that a power source voltage is below a first threshold voltage, and the saving of the data continues and a predetermined shutdown processing is carried out when the power failure detecting signal has been detected that denotes that a power source voltage is below a second threshold voltage, and a computer readable memory device having a program to be executed by a computer having a volatile memory and a none volatile memory, wherein by execution of the program, a saving of data from the volatile memory into the nonvolatile memory starts when a momentary interruption detecting signal is detected that denotes that a power source voltage is below a first threshold voltage, and the saving of the data continues and a predetermined shutdown processing is carried out in the case where a momentary interruption detecting signal is detected again after a predetermined time period has elapsed since a momentary interruption detecting signal was detected.

DESCRIPTION OF THE PREFERRED EMBODIMENT

Figure 1:
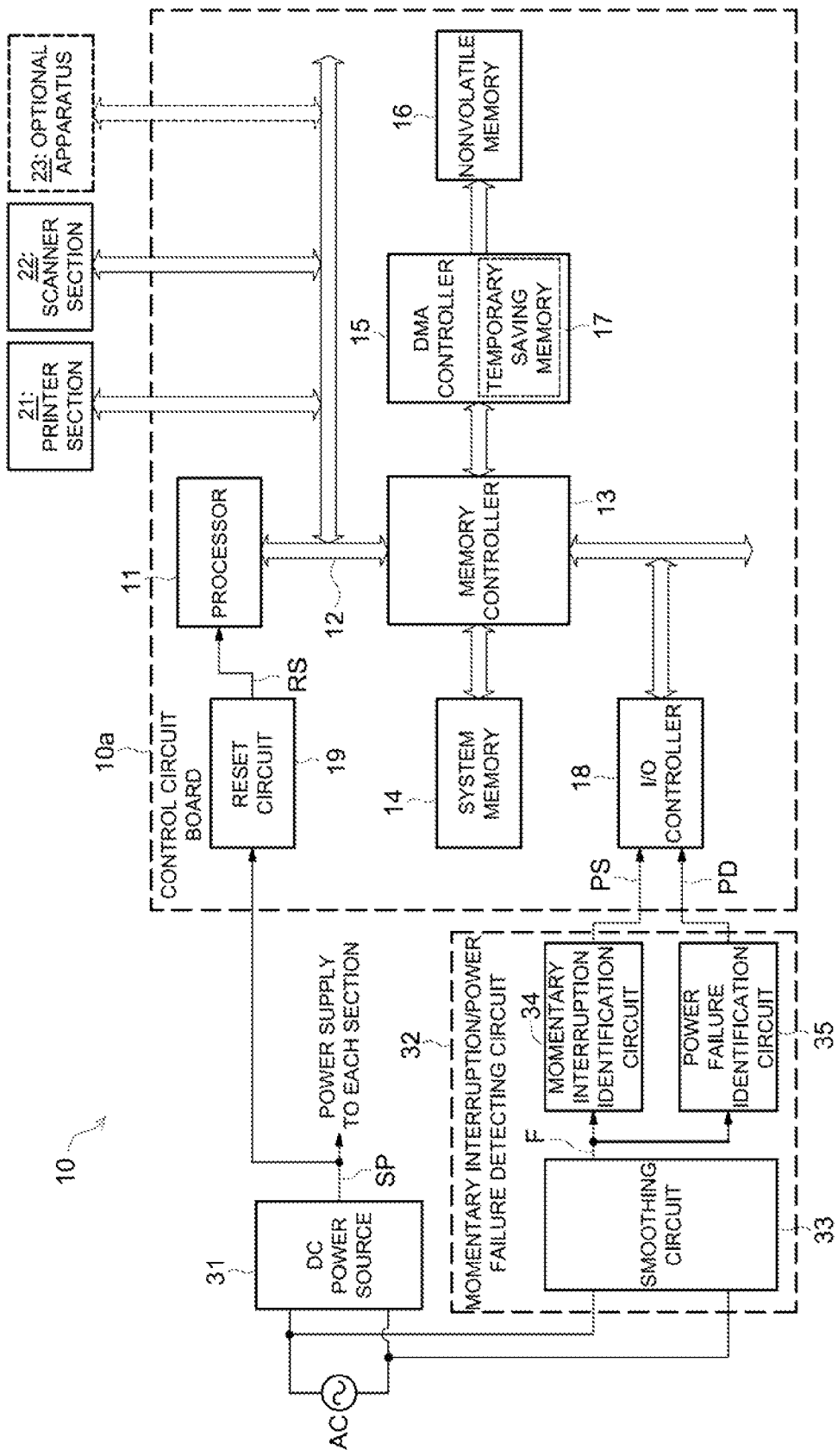
FIG. 1 is a block diagram representing the structure of the image processing apparatus as an example of data processing apparatus as the first embodiment of the present invention.

Referring to the drawings, the following describes the embodiment of the present invention:

FIG. 1 is a block diagram representing the structure of the image processing apparatus 10 as an example of data processing apparatus as the first embodiment of the present invention. The image processing apparatus 10 has a copying function of reading a document image, creating an copied image thereof on a recording sheet and output ting the sheet. The image processing apparatus 10 has a processor (CPU) 11 as a control unit for controlling the operation of this apparatus. The processor 11 is connected with a memory controller 13 through a bus 12. It is connected with a volatile system memory 14, DMA (Direct Memory Access) controller 15 and I/O controller 18 under the control of the memory controller 13. Further, a nonvolatile memory 16 is connected under the control of the DMA controller 15. A temporary saving memory 17 is provided inside the DMA controller 15. They are mounted on the control circuit board 10a.

Further, the bus 12 is connected with a printer section 21 and scanner section 22. It can also be connected with an optional apparatus 23 such as a finisher for providing finishing processes including the operations of punching, binding and folding the printed sheet. The bus 12 is also connected with the operation/display section (not illustrated) for displaying and receiving inputs by the user such as an operation screen, and communication control section (not illustrated) for communication with an external apparatus via the LAN (Local Area Network).

The scanner section 22 is provided with a light source for applying light to the document, a line image sensor for reading one line of the document across the width, a traveling mechanism for traveling the per-line reading position along the length of the document, an optical component made up of a lens and mirror for forming an image by leading the light reflected from the document to the line image sensor and a control section for controlling the operation of the scanner section 22. The line image sensor is formed of a CCD (Charge Coupled Device). The scanner section 22 also includes an analog-to-digital converter whereby the analog image signal out put ted from the line image sensor is converted into the digital image data. Further, the scanner section 22 contains an automatic document feeding apparatus (not illustrated) that sequentially reads a plurality of documents on a continuous basis.

The printer section 21 ensures that an image corresponding to the image data having been inputted is formed on a recording sheet in an electrophotographic process and the sheet is outputted. It is a so-called laser printer including a recording sheet conveyance apparatus, photoreceptor drum, charging apparatus, laser unit, development apparatus, transfer/separation apparatus, cleaning apparatus, fixing apparatus and control section for controlling them (neither is illustrated).

Each of the control sections of the printer section 21 and scanner section 22 comprises mainly a CPU, ROM (Read Only Memory) and RAM (Random Access Memory). Each of the control sections of the printer section 21 and scanner section 22 communicates with the processor 11 to exchange operation commands and status instructions, and controls reading of the document or formation of the image according to the instruction from the processor 11.

The system memory 14 is a volatile memory for storing the program to be executed by the processor 11, and serves as a work memory when the processor 11 executes the program. It is also used to store the image data.

The nonvolatile memory 16 ensures that the stored contents are maintained even when power is off. The nonvolatile memory 16 stores predetermined data such as parameters inherent to the apparatus that must be preserved even after power is off.

The temporary saving memory 17 temporarily stores the data (hereinafter referred to as "saved data") to be saved to the nonvolatile memory 16 from the system memory 14 when power is off.

The DMA controller 15 transfers the contents of the temporary saving memory 17 to the nonvolatile memory 16. The DMA controller 15 is structured as an ASIC (Application Specific Integrated Circuit), and the temporary saving memory 17 is provided inside the ASIC. The processor 11 gains access to the temporary saving memory 17 and non-volatile memory 16 through the memory controller 13 and DMA controller 15 to perform data read/write operations. Further, the DMA controller 15 is designed to permit transfer of data between the system memory 14 and temporary saving memory 17.

The image processing apparatus 10 contains a DC power source 31 for supplying power to the electrical parts inside the image processing apparatus 10 such as the control circuit board 10a, printer section 21, scanner section 22 and optional apparatus 23 by converting the AC input into DC voltage; and an AC input momentary interruption/power failure detecting circuit 32 for detecting the momentary interruption and power failure. The output from the DC power source 31 is inputted into the resetting circuit 19 provided on the control circuit board 10a. The resetting circuit 19 monitors the output voltage SP of the DC power source 31 and outputs the reset signal RS to the processor 11 when the output voltage SP is below the predetermined reset threshold value.

The momentary interruption/power failure detecting circuit 32 has a smoothing circuit 33, momentary interruption identification circuit 34 and power failure identification circuit 35. The smoothing circuit 33 smoothes the AC input, and converts it into the DC voltage conforming to the AC input.

The momentary interruption identification circuit 34 is a circuit for detecting the momentary interruption of the AC input. The momentary interruption can be defined as a momentary reduction or interruption of the AC input voltage. Despite momentary interruption, there is almost no reduction in the output voltage SP of the DC power source 31, and the resetting circuit 19 does not output a reset signal RS (or the circuit section such as the processor 11 operates normally). To put it in greater details, the momentary interruption identification circuit 34 outputs the momentary interruption detecting signal PS indicating the occurrence of momentary interruption, when the output voltage F of the smoothing circuit 33 has been reduced below the predetermined momentary interruption identification threshold value (first threshold voltage).

The power failure identification circuit 35 is a circuit to detect the AC input power failure. The power failure can be defined as reduction in the output voltage SP of the DC power source 31 resulting from continued momentary interruption until the resetting circuit 19 outputs a reset signal RS (or the normal operation of each circuit section such as the processor 11 cannot be continued). The power failure identification circuit 35 outputs the power failure detecting signal PD when the output voltage F of the smoothing circuit 33 is below the power failure identification threshold value (second threshold voltage) which is still lower than the momentary interruption identification threshold value.

For example, the momentary interruption identification threshold value is set to the value wherein the output voltage F of the smoothing circuit 33 has been reduced by the absence of the AC input by one wave or more. The power failure identification threshold value is set to the value wherein the output voltage F of the smoothing circuit 33 is reduced by the absence of the AC input by three waves or more. When the AC input is 50 Hz (Hertz), for example, one period of a wave corresponds to 20 ms. The momentary interruption identification threshold value and power failure detection threshold value can be set to an appropriate level according to the maximum current consumption of the equipment or the time required for the relevant data to be saved into the nonvolatile memory 16.

The momentary interruption detecting signal PS and power failure detecting signal PD outputted from the momentary interruption/power failure detecting circuit 32 is inputted in the I/O controller 18. The processor 11 detects the status of the output of the momentary interruption detecting signal PS and power failure detecting signal PD by sampling the status of the I/O controller 18.

Figure 2:
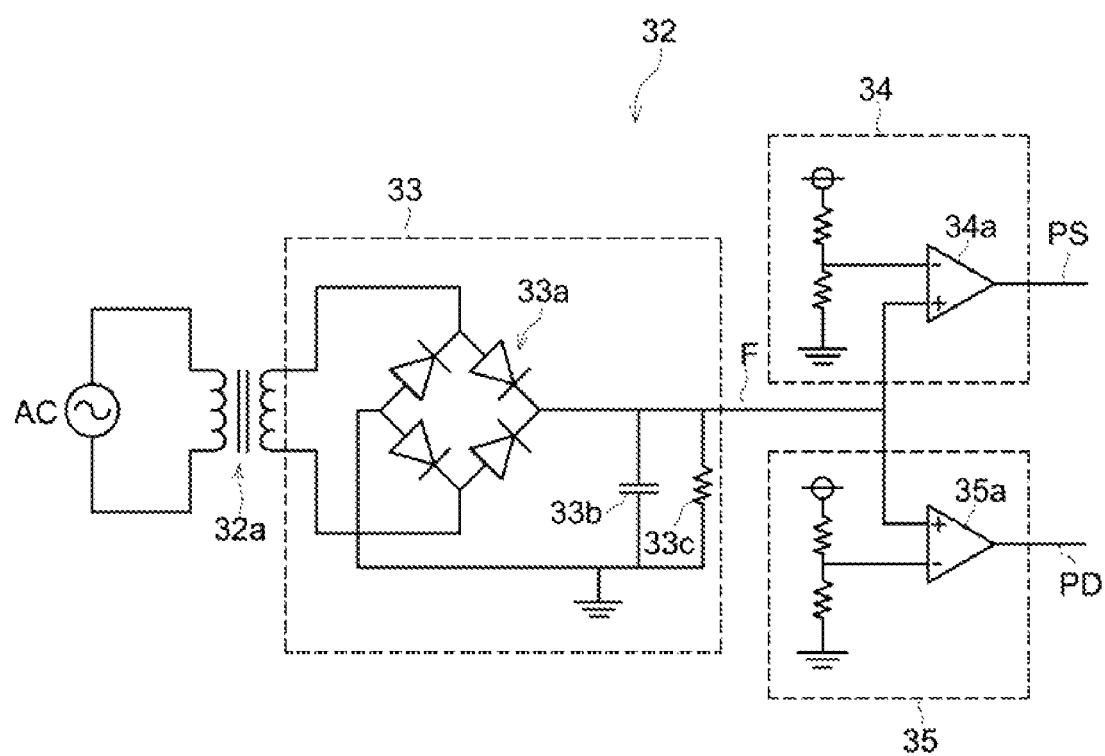
FIG. 2 is a circuit diagram representing the momentary interruption/power failure detecting circuit of the image processing apparatus as the first embodiment of the present invention.

FIG. 2 shows an example of the structure of the momentary interruption/power failure detecting circuit 32. The AC input is inputted to the primary side of the transformer 32a. A smoothing circuit 33 made up of a diode bridge 33a, capacitor 33b and resistor 33c is arranged on the secondary side of the transformer 32a. The output F of the smoothing circuit 33 is inputted to the positive (+) terminal of the comparator 34a constituting the momentary interruption identification circuit 34, and the voltage as a momentary interruption identification threshold value is applied to the negative (−) input terminal of the comparator 34a. The output of the comparator 34a becomes the momentary interruption detecting signal PS.

Similarly, the output voltage F of the smoothing circuit 33 is inputted to the positive (+) of the comparator 35a constituting the power failure identification circuit 35. The voltage as the power failure identification threshold value is applied to the negative (−) input terminal of the comparator 35a. The output of the comparator 35a becomes the power failure detecting signal PD.

In addition to the structure shown in FIG. 2, the momentary interruption/power failure detecting circuit 32 is provided with a circuit for detecting the AC input zero cross, and can be made of a circuit for determining the reduction of voltage from the timed interval for zero crossing. For example, in the case of 50Hz AC input, zero crossing occurs at every 10 ms on the normal state. While the AC input is interrupted, the next zero crossing does not occur. This signifies a prolonged timed interval of zero crossing. For example, if there is absence of the AC input corresponding to one wave due to momentary interruption, the timed interval of zero crossing will be 30 ms. If there is absence of the AC input corresponding to two waves, the timed interval of zero crossing will be 50 ms. Thus, it is possible to make such arrangements that, if the timed interval of zero crossing has exceeded 40 ms, for example, the system determines that momentary interruption has occurred. If the timed interval of zero crossing has exceeded 70 ms, for example, the system determines that power failure occurred.

Figure 3:
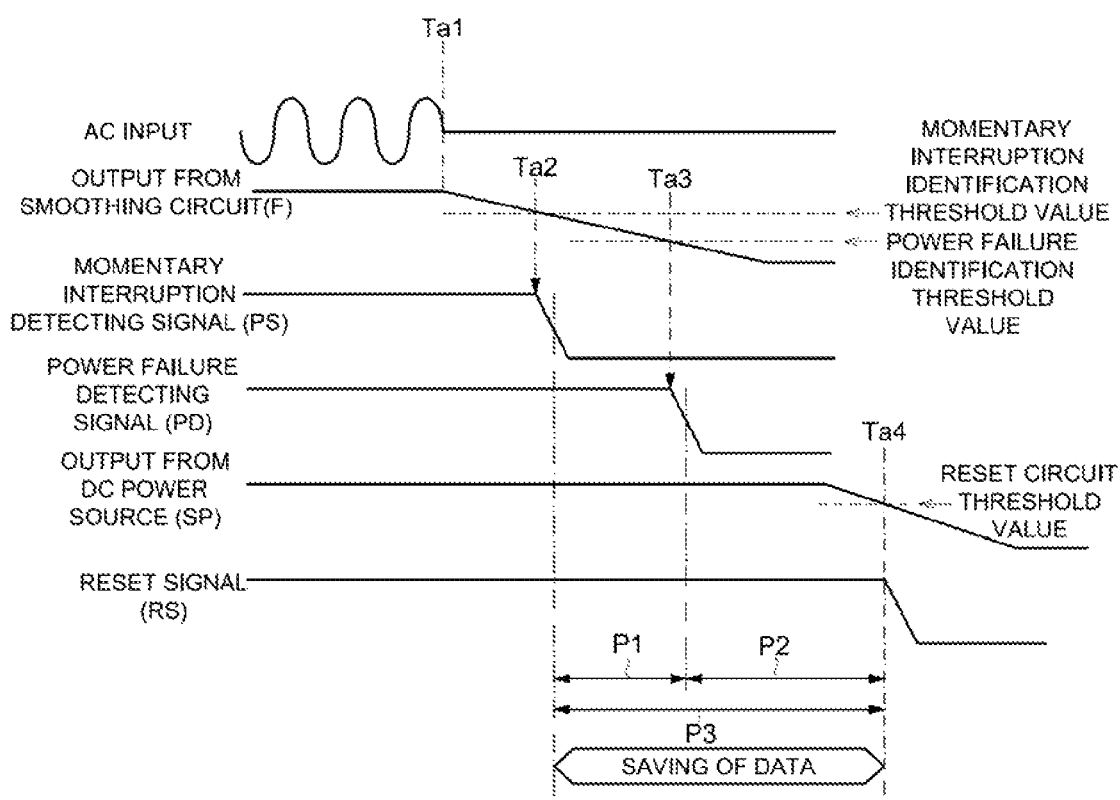
FIG. 3 is a waveform diagram representing each signal status of the power source when the AC input is interrupted for a long time in the image processing apparatus as the first embodiment of the present invention.

FIG. 3 shows each signal status of the power source when the AC input is interrupted for a long time. Immediately after the AC input is interrupted (time Ta1), the output voltage F of the smoothing circuit 33 starts to reduce gradually. When it has reduced below the momentary interruption identification threshold value (time Ta2), the momentary interruption detecting signal PS is outputted from the momentary interruption identification circuit 34. Further, the output voltage F of the smoothing circuit 33 reduces. When it has reduced below the power failure identification threshold value (time Ta3), the power failure detecting signal PD is outputted (a low level at the time of output) from the power failure identification circuit 35. After the interruption of the AC input, the output SP of the DC power source 31 maintains the normal output voltage using the electric charge stored in the capacitor for some time ever when the time Ta3 has been exceeded. After that, the output voltage starts to drop. When the output voltage SP of the DC power source 31 has reduced below the predetermined reset threshold value (time Ta4), the reset signal RS is outputted from the resetting circuit 19.

Figure 4:
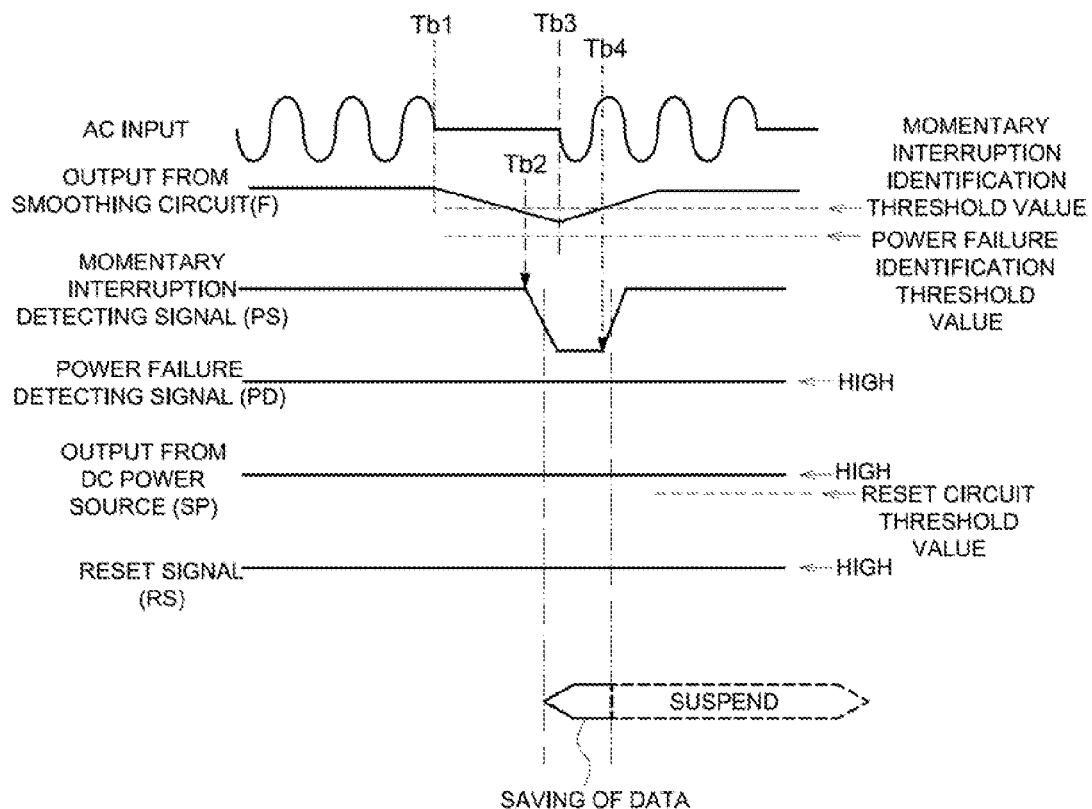
FIG. 4 is a waveform diagram representing each signal status of the power source when the AC input is momentarily interrupted in the image processing apparatus as the first embodiment of the present invention.

FIG. 4 shows each signal status of the power source when the AC input is momentarily interrupted. The AC input is interrupted at time Tb1, and then the momentary interruption detecting signal PS is outputted at time Tb2, The AC input is recovered at time Tb3 immediately thereafter. The output voltage F of the smoothing circuit 33 starts to rise before the voltage is reduced below the power failure identification threshold value. The voltage exceeds the momentary interruption identification threshold value at time Tb4, and the normal voltage is recovered. In this manner, momentary interruption detecting signal PS is outputted in the event of momentary interruption, but power failure detecting signal PD is not outputted. The output voltage SP of the DC power source 31 maintains the normal voltage level, and the reset signal RS is not outputted.

Figure 5:
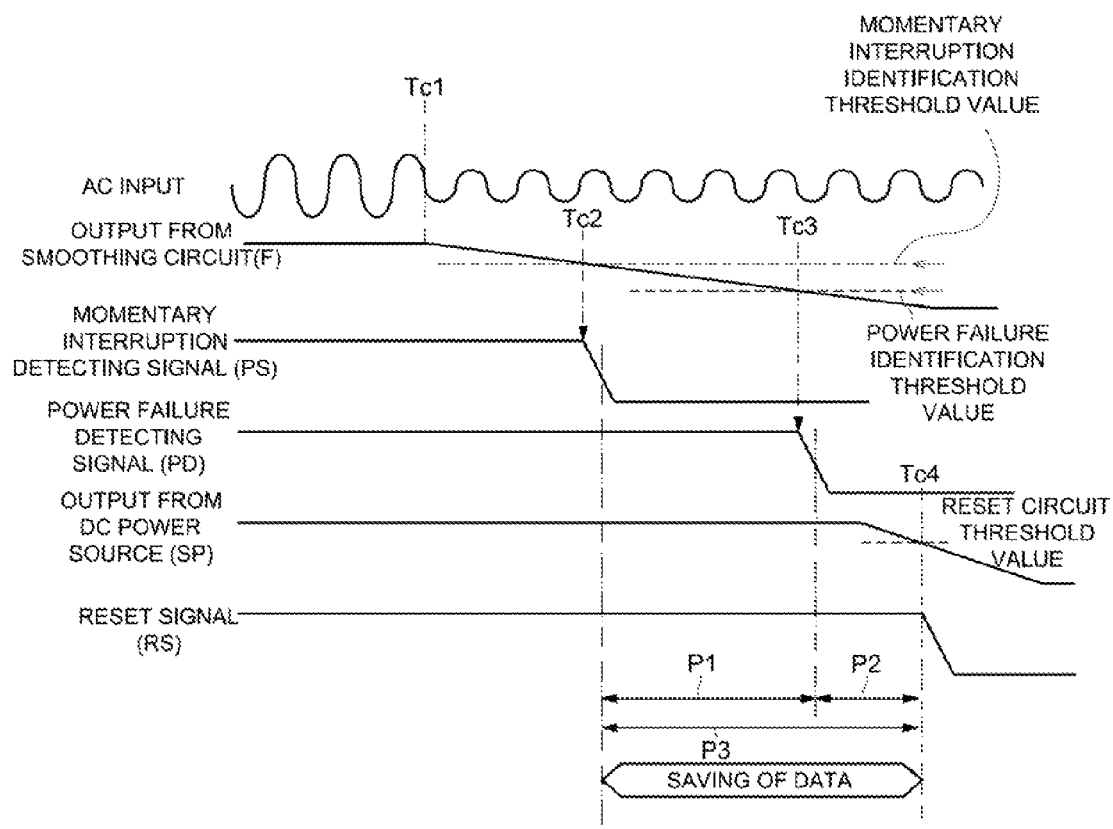
FIG. 5 is a waveform diagram representing each signal status of the power source when the AC input voltage has been reduced to 50% on a continuous basis in the image processing apparatus as the first embodiment of the present invention.

FIG. 5 shows each signal status of the power source when the AC input voltage has been reduced to 50% on a continuous basis. When the voltage of the AC input has been reduced, (time Tc1), the output voltage F of the smoothing circuit 33 starts to drop immediately thereafter. The slope of drop is more gradual than that in FIG. 3 (wherein the AC input is interrupted). When the output voltage F of the smoothing circuit 33 is reduced below the momentary interruption identification threshold value (time Tc2), momentary interruption detecting signal PS (at a low level) is outputted from the momentary interruption identification circuit 34. Further, the output voltage F of the power failure identification circuit 35 drops below the power failure identification threshold value (time Tc3), the power failure detecting signal PD (at a low level) is outputted from the power failure identification circuit 35.

Figure 6:
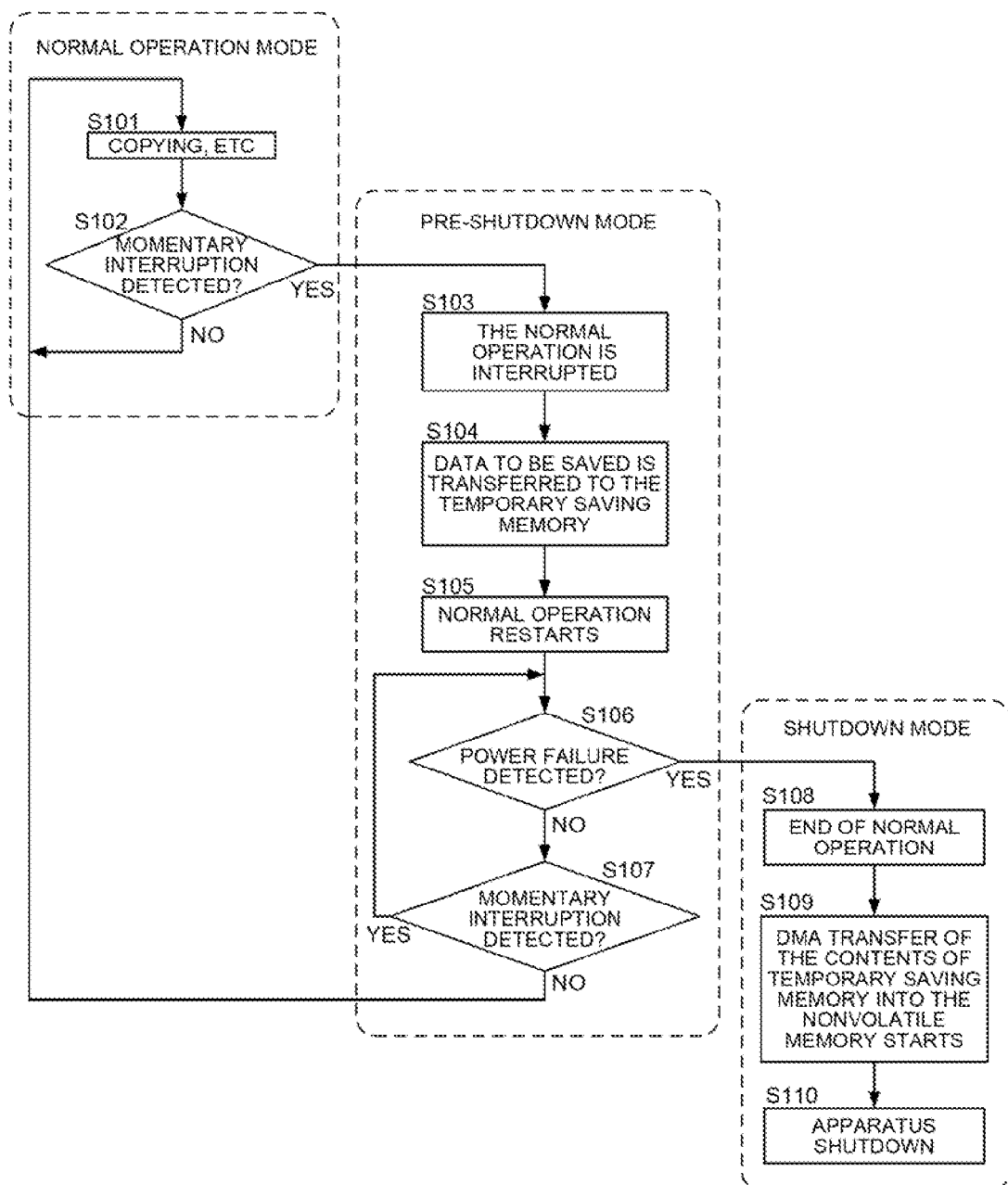
FIG. 6 is a flow chart representing a first example of processing performed by the processor of the image processing apparatus as the first embodiment of the present invention.

FIG. 6 shows a first, example of processing performed by the processor 11. In the normal state, the processor 11 performs the normal operation in the normal operation mode wherein the equipment operation such as copying operation is controlled (Step S101 and No in Step S102). When the output of the momentary interruption detecting signal PS from the momentary interruption identification circuit 34 has been detected (Yes in Step 3102) during the normal operation, the system shifts to the pre-shutdown mode. In the pre-shutdown mode, the current operation (the normal operation) is temporarily interrupted (Step S103), and saving of data into the temporary saving memory 17 starts. After that, the normal operation restarts (Step S105).

The temporary interruption of the normal operation refers to the temporary suspension of control over the printer section 21 and scanner section 22 by the processor 11. Interruption terminates in a short time and the operation of the printer section 21 and scanner section 22 continues during interruption. The operation as viewed from the user is the same as usual operation without being suspended.

The operation related to saving of data is performed in the first phase and the second phase. The first phase of data saving is implemented in the pre-shutdown mode. In the first phase, the data to be saved is transferred from the system memory 14 to the temporary saving memory 17 (Step S104). This transfer can be performed by the processor 11 or by the DMA controller 15.

After the normal operation has been restarted. (Step S105), the processor 11 monitors the output status of the power failure detecting signal PD and momentary interruption detecting signal PS (Step S106, Step S107). In this case, if the output of the momentary interruption detecting signal PS cannot be detected before the output of the power failure detecting signal PD (No in Step S107), the AC input is recovered to the normal state after momentary interruption without power failure being caused. Thus, the system goes back to the normal operation mode (Step S101) and resumes the processing. In this case, the saving of data is suspended in the middle, as shown in the lower portion of FIG. 4. Here only the first phase is implemented, and the saving of data is suspended.

When the output of the power failure detecting signal PD has been detected (Yes in Step S106), the system determines that the AC input is in the state of power failure, and enters the shutdown mode. In the shutdown mode, the normal operation terminates (Step S108). The normal operation is terminated by sending a termination command to the printer section 21 and scanner section 22 to instruct termination of the operation.

After that, the second phase of data saving process is implemented. In the second phase, the contents of the temporary saving memory 17 (data transferred from the system memory 14 to the temporary saving memory 17 in the first phase) are transferred to the nonvolatile memory 16 by the DMA controller 15 (Step 3109). Further, the processor 11 shuts down the apparatus (Step S110). Upon termination of the processes of data saving and shutdown, the reset signal PS is outputted from the resetting circuit 19 so that the power is completely turned off.

As described above, when the output of the momentary interruption detecting signal PS has been detected, the process of data saving starts. As shown in the lower portion of the FIG. 3, the time available for data saving is the total P3 of the time P1 from the output of the momentary interruption detecting signal PS to the output of the power failure detecting signal PD, and the time P2 from the output of the power failure detecting signal PD to the output of the reset signal RS. Thus, the time available for data saving is longer by time P1 than the time from the output of the power failure detecting signal PD to the start of data saving in the conventional method. This signifies a corresponding increase in the amount of data that can be saved.

In the first phase, the data to be saved is transferred to the temporary saving memory 17, not to the low-speed nonvolatile memory 16. This ensures high-speed transfer from the DMA controller 15 to the temporary saving memory 17. Further, when the power failure does not result, the second phase is not implemented, hence transfer to the nonvolatile memory 16 is not performed. This eliminates the unwanted access to the nonvolatile memory 16, despite frequent momentary interruption, and reduces the possibility of the nonvolatile memory 16 being deteriorated, with, the result that a longer service life is ensured.

The shutdown processing is a regular process to turn off power. It refers to a series of power-off operations such as the operation of retracting the head of the hard disk apparatus, the process of termination in a predetermined sequence or the operation of turning off each section.

Figure 7:
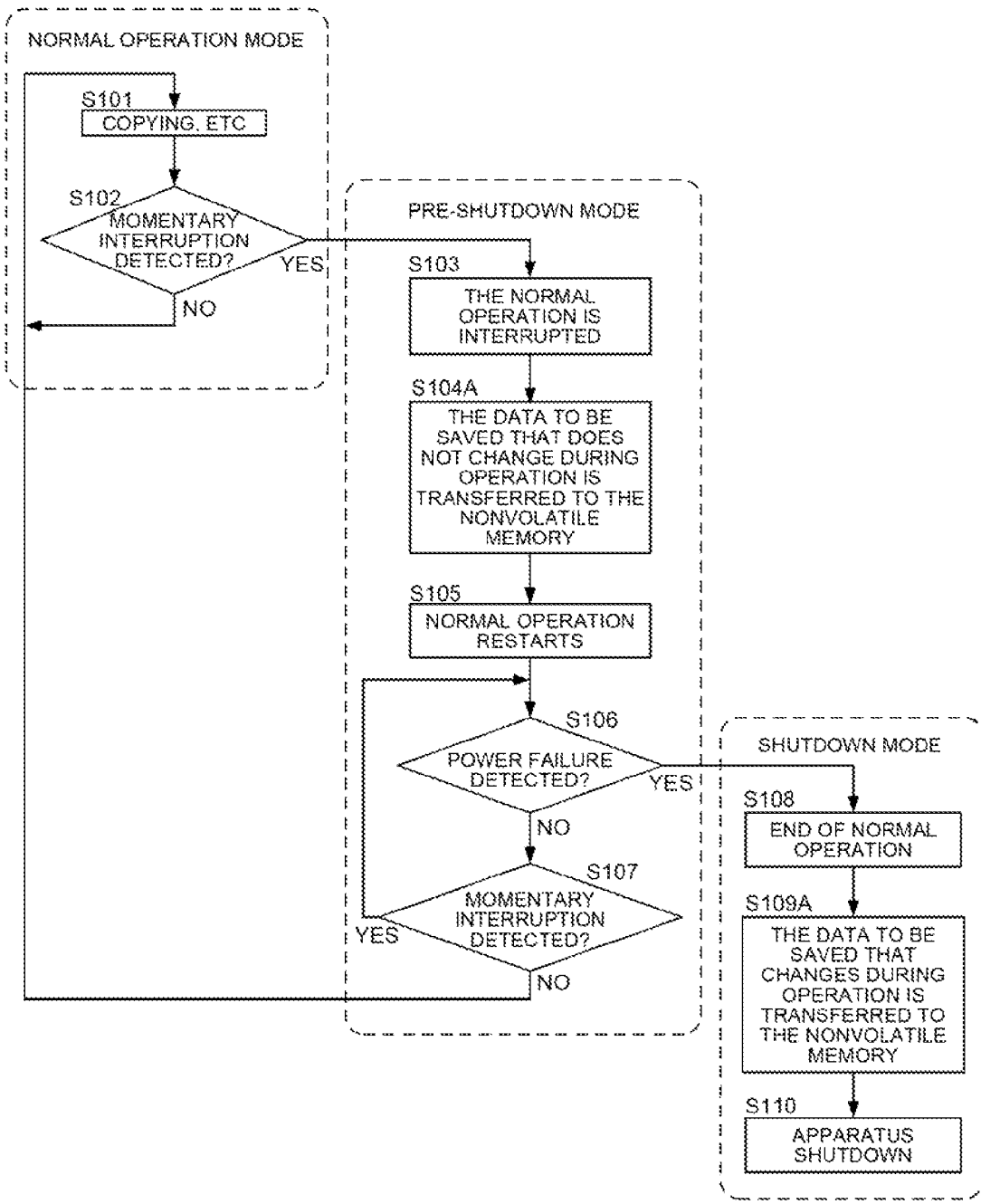
FIG. 7 is a flow chart representing a second, example of processing performed by the processor of the image processing apparatus as the first embodiment of the present invention.

FIG. 7 shows a second example of processing performed by the processor 11. In the second example, processing of data saving in the first phase and the second phase is different from that of the first example (Steps S104A and S109A). Otherwise, the processing is the same as that of the first example. In FIG. 7, the same processing as that of FIG. 6 is assigned with the same step numbers, and therefore, will not foe described to avoid duplication.

In Step S104A, of the data to be saved, the data without the value thereof being changed during the normal operation subsequent to restarting is transferred to the nonvolatile memory 16 in the first phase of data saving. This can be accomplished by the data being directly written into the nonvolatile memory 16 by the processor 11. It is also possible to make such arrangements that the processor 11 writes the data having been read from the system memory 14 into the temporary saving memory 17, and the DMA controller 15 is used to transfer it from the temporary saving memory 17 to the nonvolatile memory 16. Alternatively, it is also possible to make such arrangements that the DMA controller 15 takes charge of both the transfer from the system memory 14 to the temporary saving memory 17, and the transfer from the temporary saving memory 17 to the nonvolatile memory 16.

The data without the value thereof being changed during the normal operation subsequent to restarting refers to the data whose value does not change up to the termination of the normal operation in the Step S108, after restart in Step S105. The data whose value does not change during the normal operation subsequent to restart is exemplified by the "momentary interruption occurrence time data" and "number of copies".

In the Step S109A of the second example, of the data to be saved, the data which has not been saved in the first phase—namely, the data whose data may be changed during the normal operation subsequent to restart—is transferred to the nonvolatile memory 16 in the second phase of data saving. Similarly to the case in the first phase in the Step S104A, this transfer can be accomplished by the data being directly written into the nonvolatile memory 16 by the processor 11. It is also possible to make such arrangements that the processor 11 writes the data having been read from the system memory 14 into the temporary saving memory 17, and the DMA controller 15 is used to transfer it from the temporary saving memory 17 to the nonvolatile memory 16. Alternatively, it is also possible to make such arrangements that the DMA controller 15 takes charge of both the transfer from the system memory 14 to the temporary saving memory 17, and the transfer from the temporary saving memory 17 to the nonvolatile memory 16. The data whose value changes during the normal operation subsequent to restart is exemplified by "power failure occurrence time data", "total number of copies in the apparatus" and "the number of sheets having been copied wherein the number of copies has been set".

As described above, in the process of saving the data in the first phase in response to the output of the momentary interruption detecting signal PS, the data whose data is not changed during the normal operation subsequent to restart is saved. After that, in the process of saving the data in the second phase in response to the output of the power failure detecting signal PD, the remaining data is saved. Thus, even if the normal operation is restarted in the Step S105 after the data has been saved in the first phase, the data having been saved into the nonvolatile memory 16 in the first phase agrees with the final value on the system memory 14 when a power failure has occurred in the final stage.

Figure 8:
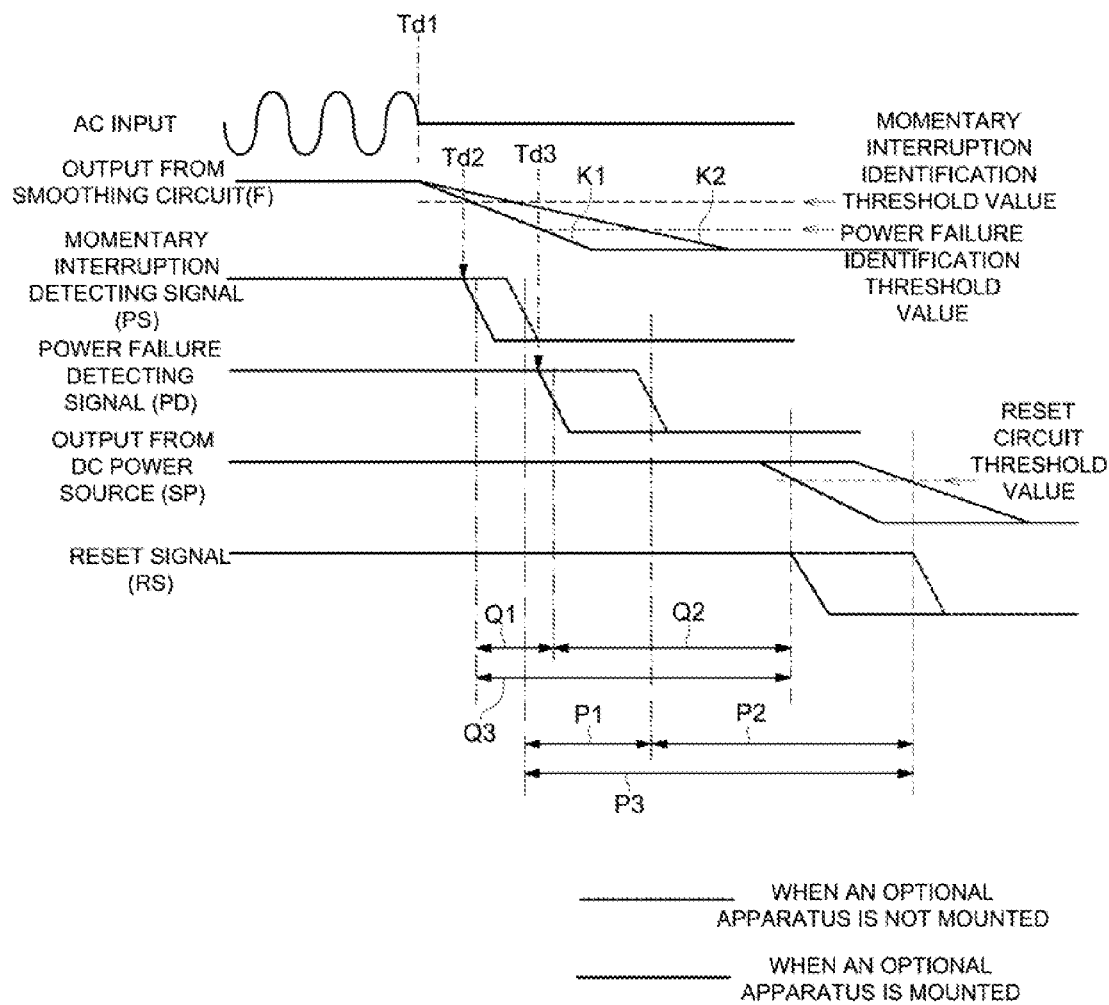
FIG. 8 is a waveform diagram representing the comparison between each signal status of the power source when an optional apparatus is mounted and the signal status when the optional apparatus is not mounted.

The following describes the example of the step taken against a change in the current consumption of the entire apparatus in conformity to the installation status of the optional apparatus:

When an optional apparatus (finisher, etc.) 23 is mounted, the current consumption as the entire image processing apparatus 10 increases over that when it is not mounted. Thus, as shown in FIG. 8, the gradient K1 representing the reduction in the output voltage F of the smoothing circuit 33 subsequent to suspension of the AC input is greater than the gradient K2 when the optional apparatus 23 is not mounted (the waveform without the optical apparatus mounted is given in a small broken line in FIG. 8). Accordingly, the time from suspension of the AC input (time Td1) to the output of the momentary interruption detecting signal PS (time Td2) is shorter than when the optional apparatus 23 is not mounted. The time (Q1) from the output of the momentary interruption detecting signal PS to the output of the power failure detecting signal PD is shorter than the corresponding time (P1) when the optional, apparatus 23 is not mounted.

In the meantime, there is no big difference in the time from the output of the power failure detecting signal PD to the output of the reset signal RS when the optional apparatus 23 is mounted (Q2), as compared to the corresponding time when it is not mounted (P2). This is because, immediately after detection of the power failure detecting signal PD, the normal operation is terminated and shutdown processing of the apparatuses including the optional apparatus 23 is performed, as shown in FIGS. 6 and 7. Thus, the time used to save the data (Q3) with the optional apparatus 23 mounted thereon is shorter than the time (P3) without the option mounted. This is because the time from the detection of the momentary interruption detecting signal PS to the detection of the power failure detecting signal PD is shorter.

Figure 9:
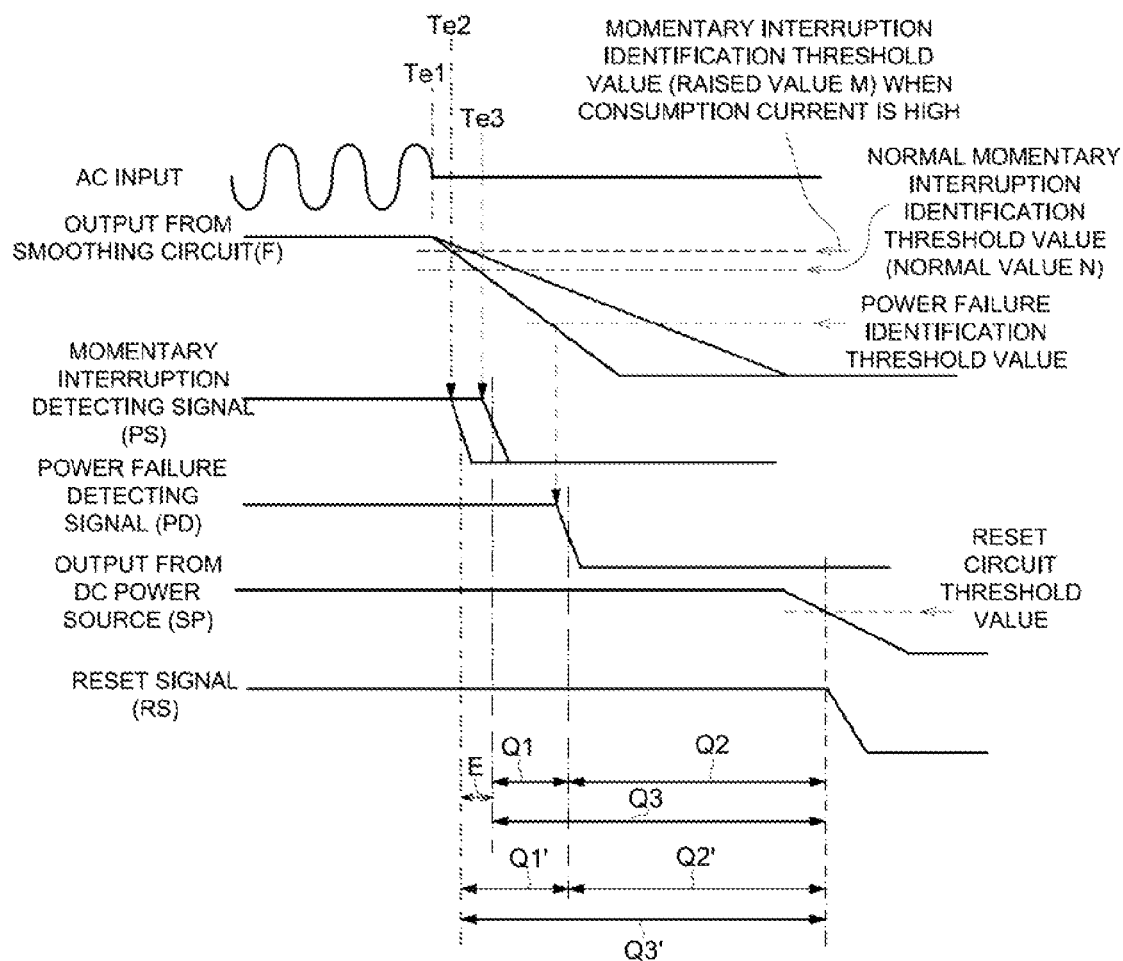
FIG. 9 is a waveform diagram representing the comparison between each signal status of the power source when the momentary interruption identification threshold value is set to the raised value M higher than the normal value N, and when it is set to the normal value N.

When the optional apparatus 23 is mounted, the momentary interruption identification threshold value is changed to a higher setting in response to the current consumption of the mounted optional apparatus 23. Thus, the time from suspension of the AC input to the output of the momentary interruption detecting signal for the momentary interruption identification threshold value is shorter than that for the normal value. Accordingly, the time available for saving of data can be prolonged. FIG. 9 shows the comparison of the waveforms of each section when the momentary interruption identification threshold value is set to the raised value M higher than the normal value N, and when it is set to the normal value N.

When the momentary interruption identification threshold value is set to the normal value N, the momentary interruption detecting signal PS is outputted at time Te3 after the AC input is suspended at time Te1. By contrast, when the momentary interruption identification threshold value is set to the raised value M, the momentary interruption detecting signal PS is outputted at time Te2 before time Te3. Thus, the data saving time is prolonged by the time difference E.

In FIG. 9, the time from the output of the momentary interruption detecting signal PS to the output of the power failure detecting signal PD for the normal value N, the time from the output of the power failure detecting signal PD to the output of the reset signal RS, and the total of these times are shown by Q1, Q2 and Q3, respectively, for the normal value N, and by Q1', Q2' and Q3', respectively, for the raised value.

The setting of the power failure identification threshold value can be changed in response to the status of mounting the optional apparatus 23 (magnitude of current consumption). To be more specific, when the current consumption of the entire apparatus is increased over the normal level by mounting the optional apparatus 23, the data saving time can be prolonged according to the following flow if the power failure identification threshold value is increased over the normal level:

1. Increase the power failure identification threshold value.
2. Enter the shutdown mode earlier than usual.
3. Earlier suspension of power supply to the optional apparatus 23.
4. Suppress reduction of the output voltage SP in the DC power source 31.
5. Delay the output of the reset signal RS.
6. Prolong the data saving time The processor 11 checks the status of the mounting of the optional apparatus 23 when turning on power, and automatically changes the setting of the momentary interruption identification threshold value and power failure identification threshold value in response to this result. Further, it is also possible to make such arrangements in the service person mode and others that the setting of the momentary interruption identification threshold value and power failure identification threshold value is changed manually in response to the status of mounting of the optional apparatus 23.

Figure 10:
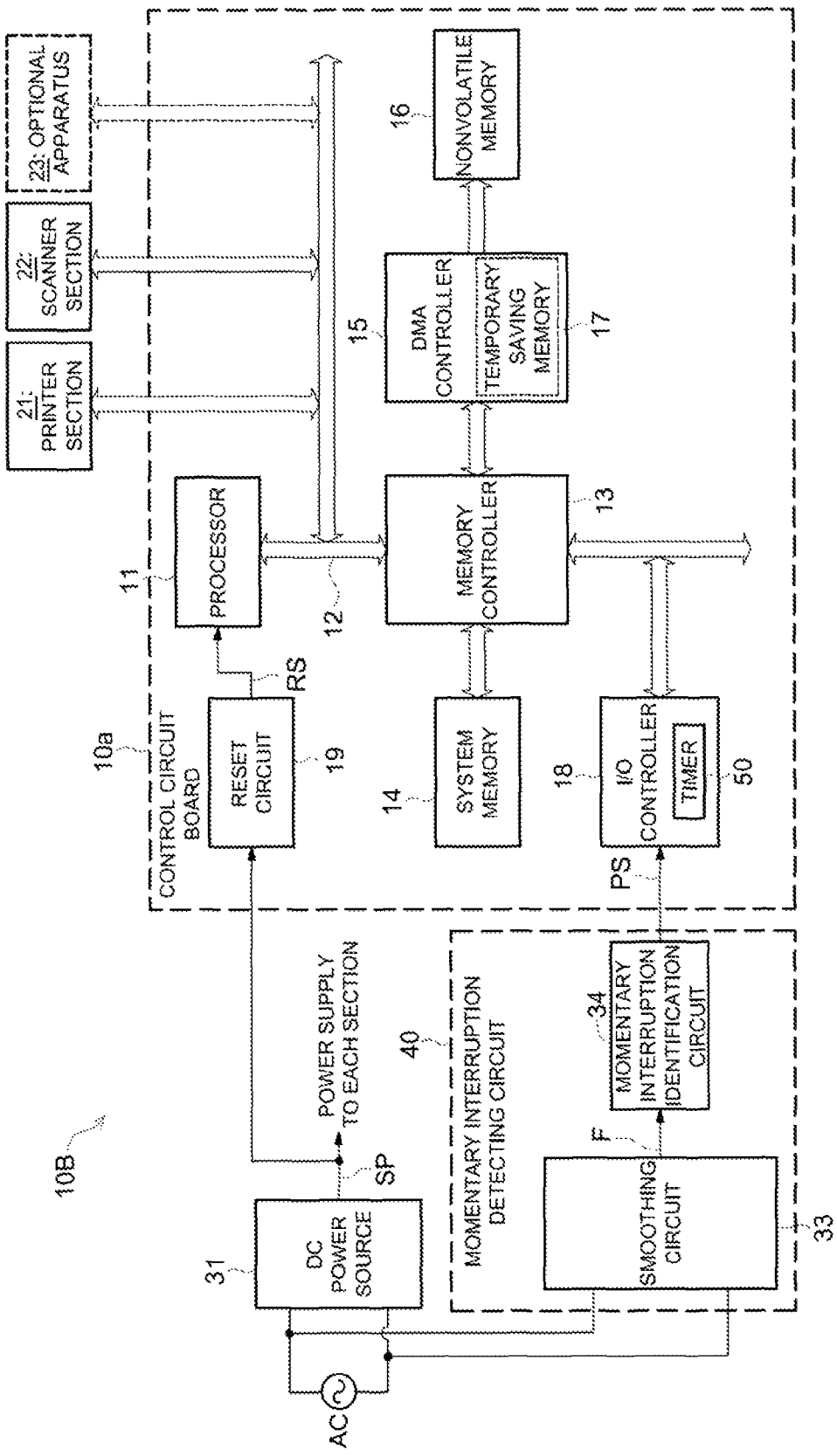
FIG. 10 is a block diagram showing the structure of the image processing apparatus as an example of the data processing apparatus as a second embodiment of the present invention.

The following describes the second embodiment:

FIG. 10 shows the structure of the image processing apparatus 10B as the data processing apparatus as a second embodiment of the present invention. In the first embodiment, both the momentary interruption and power failure are detected by the momentary interruption/power failure detecting circuit 32. In the second embodiment, instead of the momentary interruption/power failure detecting circuit 32, a momentary interruption detecting circuit 40 for detecting only the momentary interruption is provided. The function equivalent to detection of the power failure is fulfilled by a timer 50 installed inside the I/O controller 18.

The momentary interruption detecting circuit. 40 is structured in such a way that the power failure identification circuit 35 is removed from the momentary interruption/power failure detecting circuit 32. Similar to the momentary interruption/power failure detecting circuit 32, the smoothing circuit 33 and momentary interruption identification circuit 34 is provided for the momentary interruption detecting circuit 40. The momentary interruption detecting circuit 40 outputs the momentary interruption detecting signal PS to the timer 50 in the I/O controller IS and I/O controller 18. Other circuit configurations arc the same as those of the image processing apparatus 10 of FIG. 1, and therefore, will not be described to avoid duplication.

Figure 11:
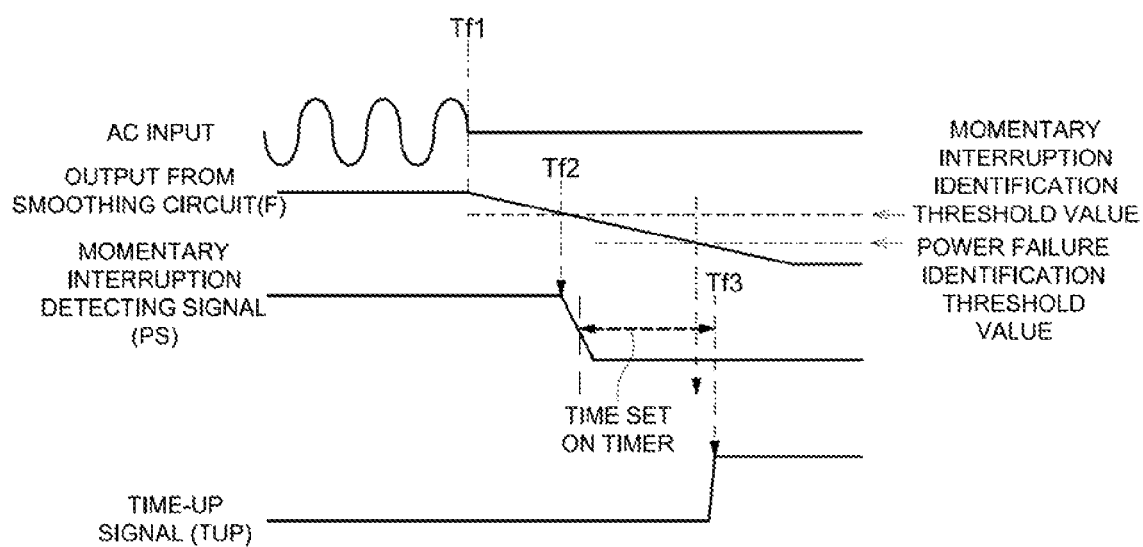
FIG. 11 is a waveform diagram representing each signal status of the power source when the AC input is interrupted for a long time in the image processing apparatus as the second embodiment of the present invention.
Figure 12:
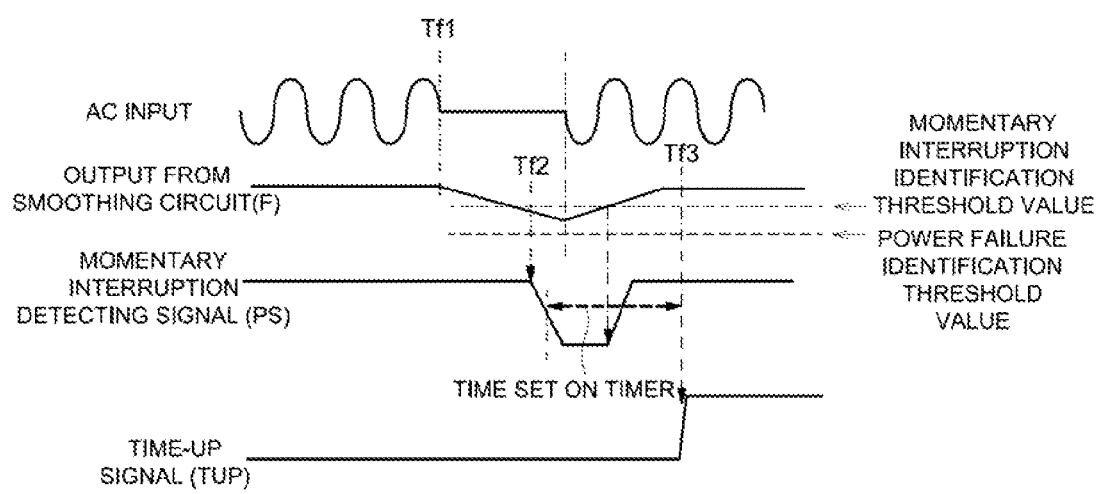
FIG. 12 is a waveform diagram representing each signal status of the power source when the AC input is momentarily interrupted in the image processing apparatus as the second embodiment of the present invention.

FIG. 11 shows each signal status of the power source when the AC input is interrupted for a long time. FIG. 12 shows each signal status of the power source when the AC input is momentarily interrupted. In FIG. 11, the output voltage F of the smoothing circuit 33 starts to drop gradually immediately after the AC input has been suspended (time Tf1). When it has reduced below the momentary interruption identification threshold value (time Tf2), the momentary interruption detecting signal PS is outputted from the momentary interruption identification circuit 34. The timer 50 starts counting the preset time (the time set on the timer) in response to the output of this momentary interruption detecting signal PS. When time is up after the expiration of the time preset on, the timer (time Tf3), the Time-up signal Tup is outputted. The processor 11 samples the I/O controller 18 to identify if the Time-up signal Tup has been outputted.

The period of the time preset on the timer is equivalent to the time from the output of the momentary interruption detecting signal PS to reduction of the output voltage F of the smoothing circuit 33 down to the power failure identification threshold value, when the AC input continues to suspend. An appropriate value is checked by a test in advance and is preset.

Accordingly, as shown in FIG. 11, if the output of the momentary interruption detecting signal PS is continued when the Time-up signal Tup has been outputted, a decision step is taken to determine that power failure has occurred. In the meantime, as shown in FIG. 12, if the output of the momentary interruption detecting signal PS is stopped (at a high level) at the time of output of the Time-up signal Tup, the system determines that momentary interruption—not power failure—has occurred.

Figure 13:
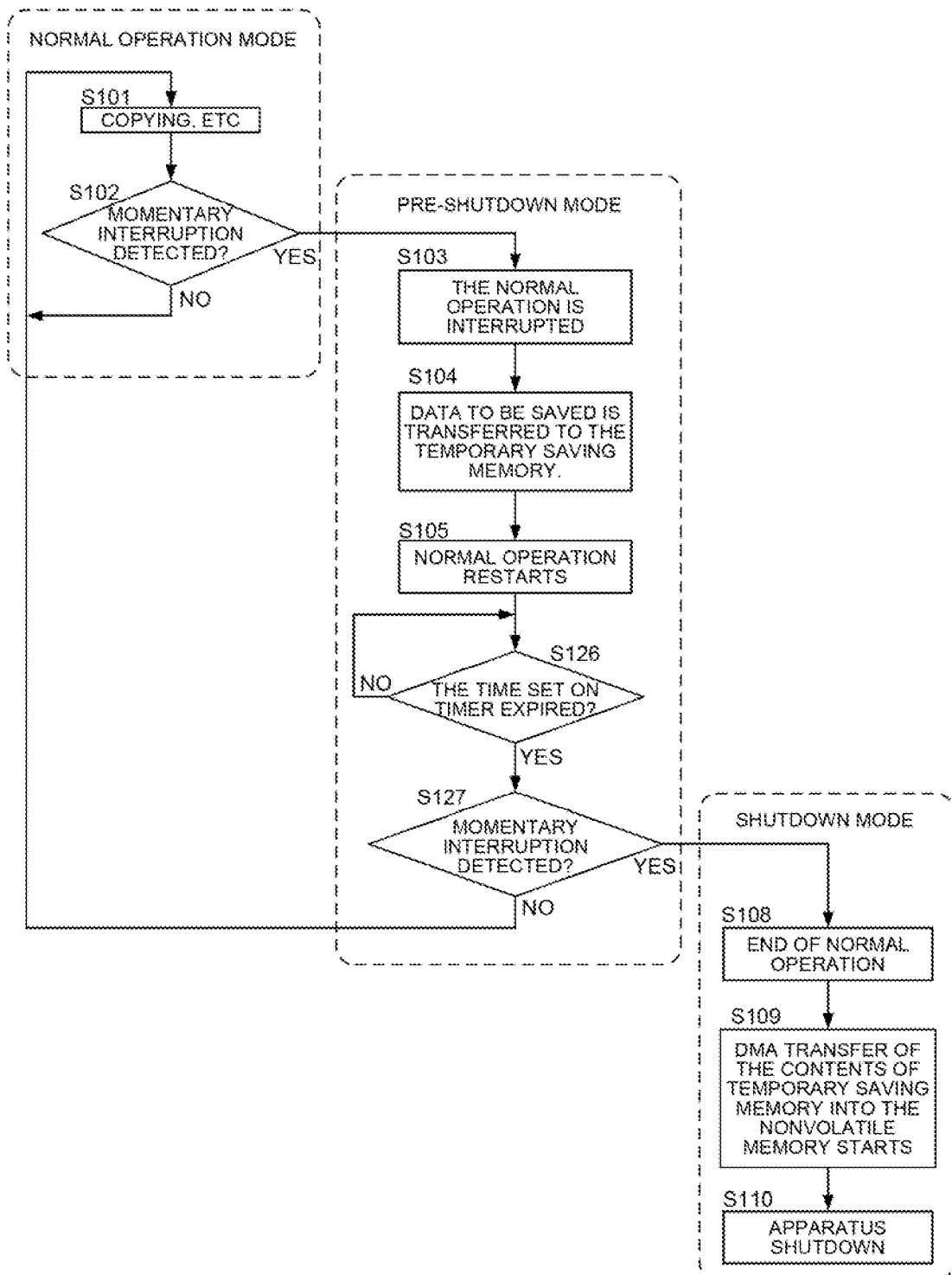
FIG. 13 is a flow chart representing a third example of processing performed by the processor of the second embodiment of the image processing apparatus as the present invention.

FIG. 13 shows a third example of processing performed by the processor 11 of the image processing apparatus 10B in the second embodiment. The third example of processing shown in FIG. 13 is the result of replacing the Step S106 by the Step S126, and the result of replacing the Step S107 by the Step S127 for the first example of processing shown in FIG. 6. Otherwise, the processing is the same as that of the first example. The same step numbers are assigned to the steps indicating the same processing as that of the first example of FIG. 6, If the output of the momentary interruption detecting signal PS has been detected (Yes in Step S102) during the normal operation (Step S101), the system enters the pre-shutdown mode. The normal operation is suspended (Step S103). In the first phase of data saving, the data to be saved is transferred from the system memory 14 to the temporary saving memory 17 (Step S104), and then the normal operation is restarted (Step S105), After that, the system waits for the expiration of the time preset on the timer (output of Time-up signal Tup) (No in Step S126). After the expiration of the time preset on the timer (Yes in Step S126), the system recheck if the momentary interruption detecting signal PS is outputted or not (Step S127). When the output of the momentary interruption detecting signal PS is detected (Yes in Step S127), the system determines that the AC input is in the state of power failure, and enters the shutdown mode, whereby the normal operation terminates (Step S108). In the second phase of data saving, the contents of the temporary saving memory 17 are transferred to the nonvolatile memory 16 from the DMA controller 15 (Step S109), and apparatus shutdown processing is performed (Step S110).

In the meantime, if the output of the momentary interruption detecting signal PS is stopped (No in Step S127) when the time preset on the timer has expired, only the momentary interruption, not power failure, has occurred. The AC input is reset to the normal state, and therefore, the system goes back to the normal operation mode (Step S101) to continue processing.

Figure 14:
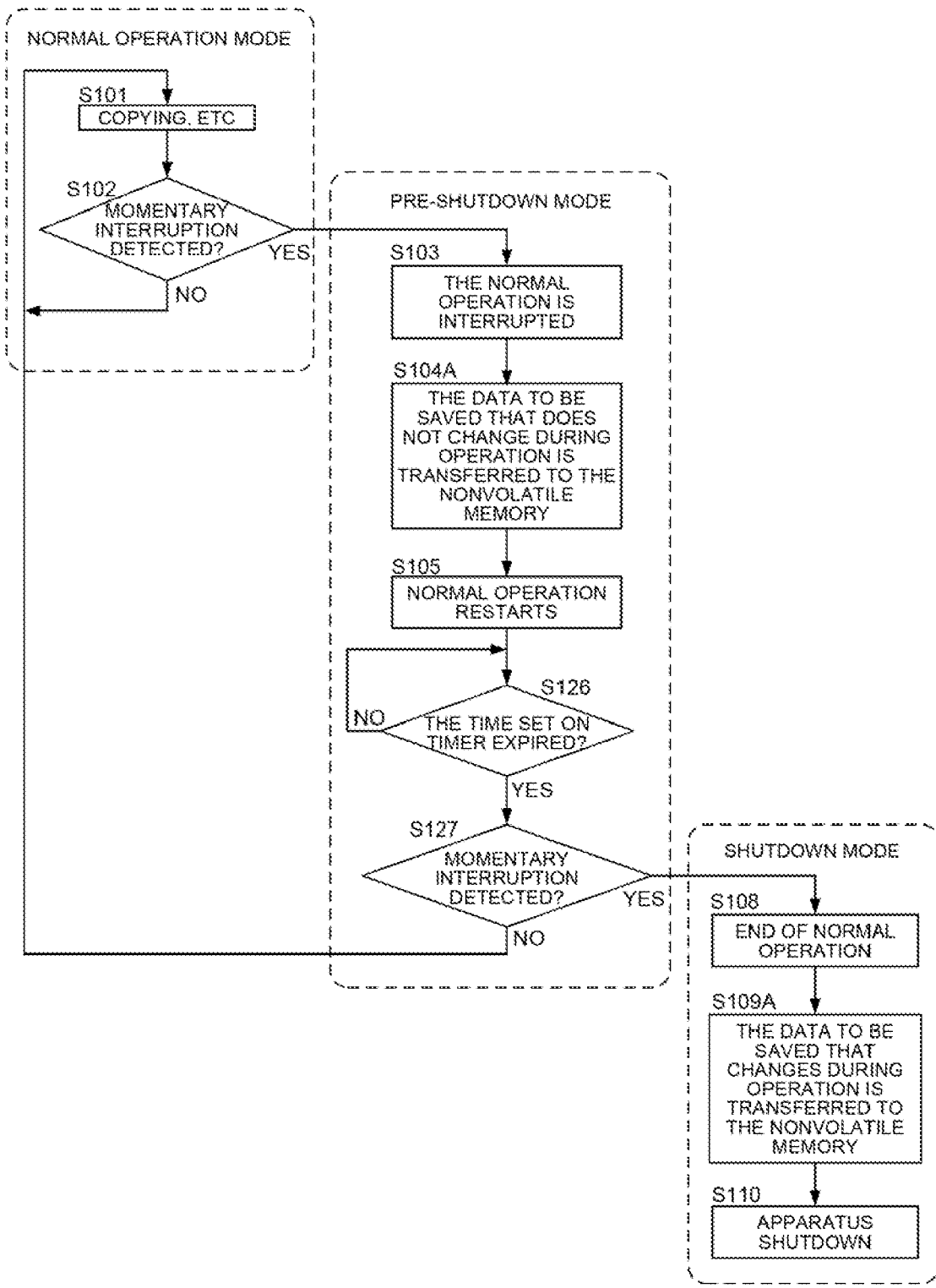
FIG. 14 is a flow chart representing a fourth example of processing performed by the processor of the second embodiment of the image processing apparatus as the present invention.
Figure 15:
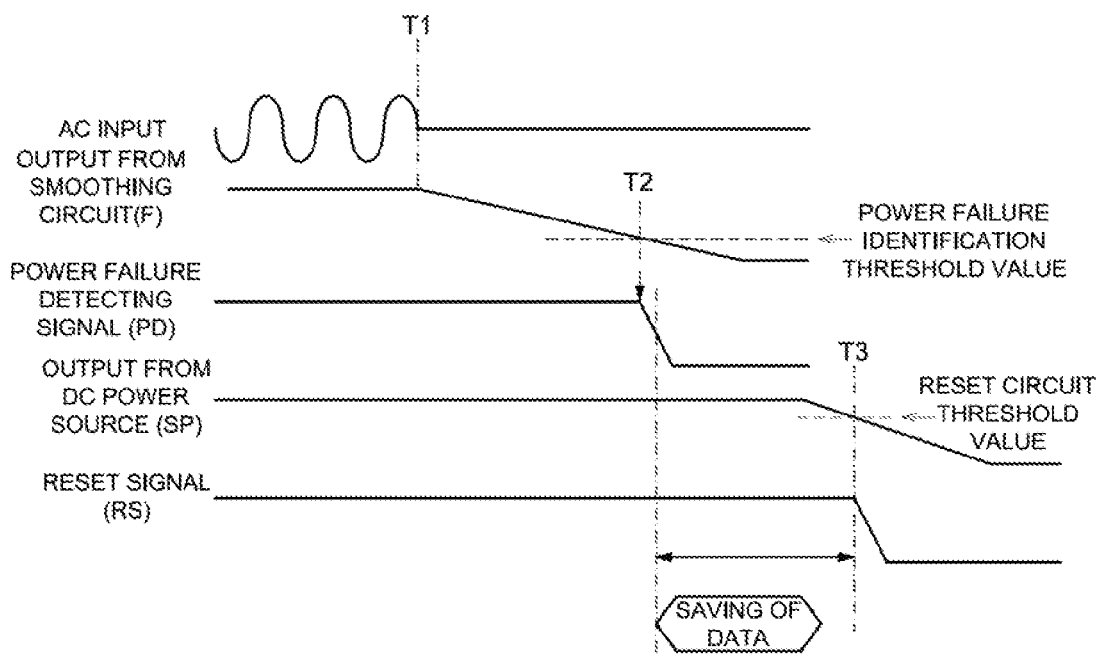
FIG. 15 is an example of the relationship between the waveforms of various portions and data saving period when the AC input is turned off in a conventional apparatus.

FIG. 14 shows the fourth example of processing performed by the processor 11 of the image processing apparatus 10B in the second embodiment. The fourth example is the result of replacing the Steps S104 and S109 for the third example of processing shown in FIG. 13 by the Steps S104A and S109A for the second example shown in FIG. 7. Otherwise, the processing is the same as that of the third example.

In the fourth example of processing shown in FIG. 14, similarly to the case of FIG. 7, the data to be saved whose value is not changed during the normal operation subsequent to restarting is sent to the nonvolatile memory 16 in the first phase of data saving in the Step S104A. Further, in the second phase of data saving of the Step S109A, the data to be saved not having been saved in the first phase, namely, the data whose value can be changed during the normal operation subsequent to restarting is sent to the nonvolatile memory 16.

As described above, similarly to the case of using both the momentary interruption detecting signal PS and power failure detecting signal PD, data saving can be started at an early stage in the structure wherein the momentary interruption detecting signal PS and timer 50 are used to detect the momentary interruption and power failure. As compared with the case of the convention method, the time available for data saving is prolonged and the amount of data to be saved is increased, accordingly. Further, there is no need of providing a power failure identification circuit 35 for generating the power failure detecting signal PD, with the result that the apparatus structure is simplified.

Similarly to the case of the first embodiment, when there is an increase in the current consumption due to mounting of the optional apparatus 23, the reduction in the time available for data saving can be minimized by changing the setting of the momentary interruption identification threshold value in response to the status of mounting of the optional apparatus 23. Further, when there is an increase in the current consumption due to mounting of the optional apparatus 23, it is possible to get the same advantage as that when the power failure identification threshold value is increased in the first embodiment, by reducing the period of time preset on the timer as compared to the time when the optional apparatus 23 is not mounted.

The embodiments of the present invention have been described with reference to diagrams. It is to be expressly understood, however, that the present invention is not restricted thereto. The present invention can be embodied in a great number of variations with appropriate modification or additions, without departing from the technological spirit and scope of the invention claimed.

For example, in the embodiments, when the power failure does not occur although the momentary interruption is detected, data saving operation is suspended (the second phase of data saving is not performed). It is also possible to make such arrangements that data saving operation (in the second phase of data saving is performed) is continued.

In the embodiment, data saving is divided into the first and second phases. However, data saving can be performed on a single phase. Further, data is saved to the nonvolatile memory 16 through the temporary saving memory 17 in the embodiment, but it is also possible to arrange such a configuration that data is saved from the system memory 14 directly into the nonvolatile memory 16. If it is so structured that data saving is started upon detection of the momentary interruption and data saving on continuous basis and shutdown processing is performed fay the power failure detection, the contents of the data saving or sequence of transfer can be as desired without any restriction.

To reduce the processing load of the processor 11, the DMA controller 15 is preferably used to transfer the data to the nonvolatile memory 16. Especially when ensuring the operation of the processor 11 related to the shutdown processing, the DMA controller 15 is preferably used to transfer data from the temporary saving memory 17 to the nonvolatile memory 16. Further, a memory or register characterised by faster access than the nonvolatile memory 16 is preferably utilized as the temporary saving memory 17.

In the embodiment, magnitude of the current consumption is identified according to the state of mounting of the optional apparatus 23. It is also possible to arrange such a configuration that the magnitude of the current consumption is identified in conformity to the operation mode of the apparatus (e.g., whether in the process of copying operation or in the standby mode), and the setting of the momentary interruption identification threshold value, power failure identification threshold value, or the period of time preset on the timer is changed in response to the result of this identification. To be more specific, when it has been determined that the current consumption is greater than that in the normal operation, the setting should be changed in such a way that the momentary interruption identification threshold value is increased over the normal value, the power failure identification threshold value is increased, or the period of time preset on the timer is reduced, similarly to the case of the optional apparatus 23 being mounted.

In the second embodiment, the period of time preset on the timer is counted by the timer 50. It is also possible to make such arrangements that this time is counted by the processor 11.

The embodiment has been described with reference to the image processing apparatus. The present invention can be applied to a data processing apparatus wherein predetermined data on the volatile memory is saved into the nonvolatile memory when power is off.

In the data processing apparatus and program of the present invention, saving of data from the volatile memory to the nonvolatile memory starts upon detection of the momentary interruption of power. This configuration ensures a longer time available for data saving than when data saving starts upon detection of power failure, and this increases the amount of data that can be saved. Further, if power failure has been detected subsequent to detection of momentary interruption, shutdown processing start. This structure keeps the apparatus operating when momentary interruption—not power failure—has occurred.

What is claimed is:

1. A data processing apparatus which saves data in a volatile memory into a nonvolatile memory when power is off, the data processing apparatus comprising:
a detecting circuit for outputting a momentary interruption detecting signal when a power source voltage is below a first threshold voltage, and a power failure detecting signal when the power source voltage is below a second threshold voltage that is lower than the first threshold voltage; and
a control section configured to start saving of the data in the volatile memory into the nonvolatile memory when the detecting circuit has output the momentary interruption detecting signal, and, when the detecting circuit has output the power failure detecting signal after the detecting circuit has output the momentary interruption detecting signal, continue the saving of the data, and carry out a predetermined shutdown processing, wherein the saving of the data comprises a first phase and a second phase and the control section interrupts a normal operation when the detecting circuit outputs the momentary interruption detecting signal, resumes the normal operation after carrying out the first phase, and carries out the second phase where the detecting circuit outputs the power failure detecting signal after the detecting circuit has output the momentary interruption detecting signal; and wherein the control section is configured to save data whose values do not change during the normal operation in the first phase among the data to be saved and save remaining data in the second phase.

2. The data processing apparatus of claim 1, wherein the control section suspends the saving of the data in the case where the detecting circuit has suspended outputting the momentary interruption detecting signal before the detecting circuit outputs the power failure detecting signal after the detecting circuit output the momentary interruption detecting signal.

3. The data processing apparatus of claim 1, wherein the first threshold voltage is adjustable corresponding to a consumption current of whole the data processing apparatus.

4. The data processing apparatus of claim 1, wherein the second threshold voltage is adjustable corresponding to the consumption current of whole the data processing apparatus.

5. The data processing apparatus of claim 1, wherein the saving of the data comprises the first phase which transfers the data in the volatile memory to a temporary saving memory and the second phase which transfers the data in the temporary saving memory to the nonvolatile memory and the control section interrupts a normal operation when the detecting circuit outputs the momentary interruption detecting signal, resumes the normal operation after carrying out the first phase, and carries out the second phase in the case where the detecting circuit outputs the power failure detecting signal after the detecting circuit has output the momentary interruption detecting signal.

6. A data processing apparatus for saving data in a volatile memory into a nonvolatile memory when a power is off, the data processing apparatus comprising:

a detecting circuit for outputting a momentary interruption detecting signal when a power source voltage is below a predetermined threshold voltage; and a control section configured to start a saving of the data in the volatile memory into the nonvolatile memory when the detecting circuit outputs the momentary interruption detecting signal, and, in the case where the detecting circuit outputs the momentary interruption detecting signal even after a predetermined time period has elapsed since the detecting circuit started outputting the momentary interruption detecting signal, continue the saving of the data and carry out a predetermined shutdown processing, wherein the saving of data comprises a first phase and a second phase and the control section interrupts a normal operation when the detecting circuit outputs the momentary interruption detecting signal, resume the normal operation after carrying out the first phase, and then carries out the second phase in the case where the detecting circuit outputs the momentary interruption detecting signal even after a predetermined time period has elapsed since the detecting circuit started outputting the momentary interruption detecting signal; and wherein the control section is configured to save data whose values do not change during the normal operation among the data to be saved in the first phase and save remaining data in the second phase.

7. The data processing apparatus of claim 6, wherein, the control section suspends the saving of the data in the case where the detecting circuit does not output the momentary interruption detecting signal after the predetermined time period has elapsed since the detecting circuit started outputting the momentary interruption detecting signal.

8. The data processing apparatus of claim 6, wherein the threshold voltage is adjustable corresponding to a consumption current of whole the data processing apparatus.

9. The data processing apparatus of claim 6, wherein the predetermined time period is adjustable corresponding to the consumption current of whole the data processing apparatus.

10. The data processing apparatus of claim 6, wherein, the saving of data comprises a first phase for transferring the data in the volatile memory to a temporary saving memory and a second phase for transferring the data in the temporary saving memory to the nonvolatile memory and the control section interrupts the normal operation when the detecting circuit outputs the momentary interruption detecting signal, resumes the normal operation after carrying out the first phase, and then carries out the second phase in the case where the detecting circuit outputs the momentary interruption detecting signal even after a predetermined time period has elapsed since the detecting circuit started outputting the momentary interruption detecting signal.

11. A computer readable memory medium storing a program to be executed by a computer having a volatile memory and a none volatile memory, wherein by execution of the program, a saving of data in the volatile memory into the nonvolatile memory starts when a momentary interruption detecting signal is detected that denote that a power source voltage is below a first threshold voltage, and the saving of the data continues and a predetermined shutdown processing is carried out when the power failure detecting signal has been detected that denotes that a power source voltage is below a second threshold voltage that is lower than the first threshold voltage, wherein the saving of the data comprises a first phase and a second phase and a normal operation is interrupted when the momentary interruption detecting signal is outputted, the normal operation is resumed after carrying out the first phase, and the second phase is carried out in case where the power failure detecting signal is outputted after the detecting circuit has output the momentary interruption detecting signal, and wherein data whose values do not change during the normal operation among the data to be saved is saved in the first phase and remaining data is saved in the second phase.

12. A computer readable memory device having a program to be executed by a computer having a volatile memory and a nonvolatile memory, wherein by execution of the program, a saving of data from the volatile memory into the nonvolatile memory starts when a momentary interruption detecting signal is detected that denotes that a power source voltage is below a first threshold voltage, and the saving of the data continues and a predetermined shutdown processing is carried out in the case where a momentary interruption detecting signal is detected again after a predetermined time period has elapsed since a momentary interruption detecting signal was detected, wherein the saving of data comprises a first phase and a second phase and a normal operation is interrupted when the momentary interruption detecting signal is outputted, the normal operation is resumed after carrying out the first phase, and then the second phase is carried out in the case where the momentary interruption detecting signal is outputted even after a predetermined time period has elapsed since starting outputting the momentary interruption detecting signal, and wherein data whose values do not change during a normal operation among the data to be saved is saved in the first phase and remaining data is saved in the second phase.

* * * * *